US007295722B2

(12) United States Patent
Yonekubo

(10) Patent No.: US 7,295,722 B2
(45) Date of Patent: Nov. 13, 2007

(54) SCANNING DEVICE, LASER PROJECTOR, AND OPTICAL DEVICE

(75) Inventor: Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 709 days.

(21) Appl. No.: 10/853,284

(22) Filed: May 26, 2004

(65) Prior Publication Data

US 2005/0024482 A1  Feb. 3, 2005

(30) Foreign Application Priority Data

Jun. 2, 2003   (JP)   ............................. 2003-156825
May 21, 2004  (JP)   ............................. 2004-151863

(51) Int. Cl.
  *G06K 7/10*   (2006.01)
  *H04N 1/04*   (2006.01)
  *G02B 26/08*  (2006.01)

(52) U.S. Cl. ....................... 382/321; 358/474; 359/205

(58) Field of Classification Search ................ 382/312, 382/318, 319, 321; 358/471, 474; 359/197, 359/202, 205, 207
See application file for complete search history.

(56) References Cited

U.S. PATENT DOCUMENTS

| 5,151,890 A |   | 9/1992 | Yonekubo |         |
|-------------|---|--------|----------|---------|
| 5,657,146 A | * | 8/1997 | Choi et al. | 359/205 |
| 5,715,079 A | * | 2/1998 | Ono | 359/205 |
| 5,815,301 A | * | 9/1998 | Naiki et al. | 359/205 |
| 6,178,030 B1 | * | 1/2001 | Yamakawa | 359/207 |
| 6,590,688 B2 | * | 7/2003 | Ishihara | 359/205 |
| 2002/0057481 A1 |   | 5/2002 | Souda et al. |         |

FOREIGN PATENT DOCUMENTS

| JP | A-2-294942 | 12/1990 |
|----|------------|---------|
| JP | A-7-98884  | 4/1995  |

* cited by examiner

*Primary Examiner*—Daniel Mariam
(74) *Attorney, Agent, or Firm*—Oliff & Berridge, PLC

(57) ABSTRACT

A scanning device, a laser projector and an optical device that are capable of accomplishing a wide scanning area in a simple manner include a galvanomirror that is a scanning part scans a laser light in a two-dimensional direction. The laser light from the galvanomirror is incident on a scanning optical system. The scanning optical system includes a first lens group having a positive refracting power and a second lens group having the positive refracting power in this order from the scanning part. The galvanomirror is disposed in the vicinity of a focal position that is located at an incident side of the laser light of the first lens group. The first lens group and second lens group are disposed such that the focal position that is located at an exiting side of the laser light of the first lens group is approximately coincident with the focal position that is located at an incident side of the laser of the second lens group. An absolute value of the value that is calculated by dividing the focal distance of the first lens group by the focal distance of the second lens group is larger than 1.

8 Claims, 6 Drawing Sheets

SCANNING DEVICE, LASER PROJECTOR, AND OPTICAL DEVICE

BACKGROUND OF THE INVENTION

1. Field of Invention

The present invention relates to a scanning device, especially a device to scan laser light, like a beam, a laser projector and an optical device.

2. Description of Related Art

In the related art, a galvanomirror or the like are used as an optical system to scan a laser light from a laser light source in a two-dimensional direction. The galvanomirror scans the laser light in the two-dimensional direction with a plane mirror that is rotated approximately two perpendicularly crossing directions by a drive, such as an electrostatic actuator or the like. Also, a micro machine technique makes it easy to produce the galvanomirror that is capable of operating at a high speed.

SUMMARY OF THE INVENTION

However, the related art galvanomirror is merely capable of rotating by a small angular amount. Therefore, when the laser light is scanned in the two-dimensional direction in a predetermined plane, such as a screen, a much longer distance between the galvanomirror and the screen is required. For example, in a laser projector that is equipped with the related art galvanomirror, it is difficult to obtain a large projection screen if the screen is placed close to the projector. Employing a galvanomirror that is capable of rotating by a larger angular amount is conceived as a possible countermeasure for the problem. However, it is not preferable because of following reasons: If the electrostatic actuator is used as a driver for the larger angular amount, a driving current increases tremendously. Also it results in an extremely small mirror. Alternatively, if the electromagnetic actuator is used as a driver for the larger angular amount, this also increases the driving current tremendously. Subsequently, it is difficult in a related art scanning optical system to accomplish a wide scanning area in a simple manner.

In consideration of the above-mentioned problems, the invention provides a scanning device, a laser projector and an optical device that are capable of accomplishing the wide scanning area in a simple manner In order to address the above-mentioned problem and accomplish the above, a scanning device of an aspect of the invention includes a scanning part scanning laser light like a beam and a scanning optical system on which the laser light from the scanning part is incident. The scanning optical system includes a first lens group having a positive refracting power and a second lens group, in this order, from the scanning part. The scanning part is disposed in the vicinity of a focal position that is located at an incident side of the laser light of the first lens group. The first lens group and the second lens group are disposed such that the focal position that is located at an exiting side of the laser light of the first lens group is approximately coincident with the focal position that is located at an incident side of the laser light of the second lens group. An absolute value of the value that is calculated by dividing the focal distance of the first lens group by the focal distance of the second lens group is larger than 1. Accordingly, a collimated light that is incident on the first lens group in the scanning optical system emits from the second lens group as the collimated light. In this way, the scanning optical system forms an afocal system. Also, the value that is calculated by dividing the focal distance of the first lens group by the focal distance of the second lens group is proportional to an angular magnification of the scanning optical system. Thus, the scanning optical system has the angular magnification that is larger than 1. Therefore, in the scanning optical system, the laser light entered from the scanning part is converted into the laser light that has a larger exiting angle than the incident angle and exits. As a result, a wider scanning area can be accomplished in a simple manner.

Also, according to an aspect of the invention, it is preferable that the first lens group and the second lens group may have the positive refracting power respectively. This enables the scanning optical system to form so-called Newtonian type optical system.

Also, according to an aspect of the invention, the first lens group may have the positive refracting power and the second lens group may have a negative refracting power. This enables the scanning optical system to form so-called Galilean type optical system.

Also, according to an aspect of the invention, the scanning part may scan in an one-dimensional direction or a two-dimensional direction.

A laser projector of an aspect of the invention includes a laser light source providing laser light like a beam, a scanning part scanning the laser light in a two-dimensional direction, and a scanning optical system on which the laser light from the scanning part is incident. The scanning optical system includes a first lens group having a positive refracting power and a second lens group, in this order, from the scanning part. The scanning part is disposed in the vicinity of a focal position, that is located at an incident side of the laser light of the first lens group. The first lens group and the second lens group are disposed such that the focal position that is located at an exiting side of the laser light of the first lens group, is approximately coincident with the focal position that is located at an incident side of the laser light of the second lens group. An absolute value of the value that is calculated by dividing the focal distance of the first lens group by the focal distance of the second lens group is larger than 1. As for the above described "in this order from the scanning part", it can be defined "in the order from the incident of the laser light on the scanning optical system, regardless of the position of the scanning part." Accordingly, a collimated light that is incident on the first lens group in the scanning optical system exits from the second lens group as the collimated light. In this way, the scanning optical system forms an afocal system. Also, the value that is calculated by dividing the focal distance of the first lens group by the focal distance of the second lens group is proportional to an angular magnification of the scanning optical system. Thus, the scanning optical system has the angular magnification that is larger than 1. Therefore, in the scanning optical system, the laser light entered from the scanning part is converted into the laser light that has a larger exiting angle than the incident angle and exits. Consequently, this makes it possible to accomplish a wide projection screen with the condition where the projection distance between the scanning optical system and the screen is shortened.

Also, according to an aspect of the invention, the first lens group and the second lens group may have the positive refracting power respectively. This enables the scanning optical system to form so-called Newtonian type optical system.

Also, according to an aspect of the invention, the first lens group may have the positive refracting power and the second lens group may have a negative refracting power. This enables the scanning optical system to form so-called Galilean type optical system.

An optical device of an aspect of the invention includes a laser light source providing laser light like a beam, a scanning part scanning the laser light, and a scanning optical system on which the laser light from the scanning part is incident. The scanning optical system includes a first lens group having a positive refracting power and a second lens group, in this order, from the scanning part. The scanning part is disposed in the vicinity of a focal position that is located at an incident side of the laser light of the first lens group. The first lens group and the second lens group are disposed such that the focal position that is located at the laser light exiting side of the first lens group is approximately coincident with the focal position that is located at an incident side of the laser light of the second lens group. An absolute value of the value that is calculated by dividing the focal distance of the first lens group by the focal distance of the second lens group is larger than 1. As for the above described "in this order from the scanning part", it means "in the order from the incident of the laser light on the scanning optical system, regardless of the position of the scanning part". Also, according to the preferable aspect of the invention, it is preferable that the scanning part scanning in one-dimensional direction or two-dimensional direction. In the case where the optical device is a printer, for example, it is possible to shorten the distance between a photosensitive drum and the scanning optical system. As a result, a compact printer can be achieved.

DETAILED DESCRIPTION OF EXEMPLARY EMBODIMENTS

Exemplary embodiments of the invention will now be described with reference to the accompanying drawings.

First Exemplary Embodiment

Figure 1:
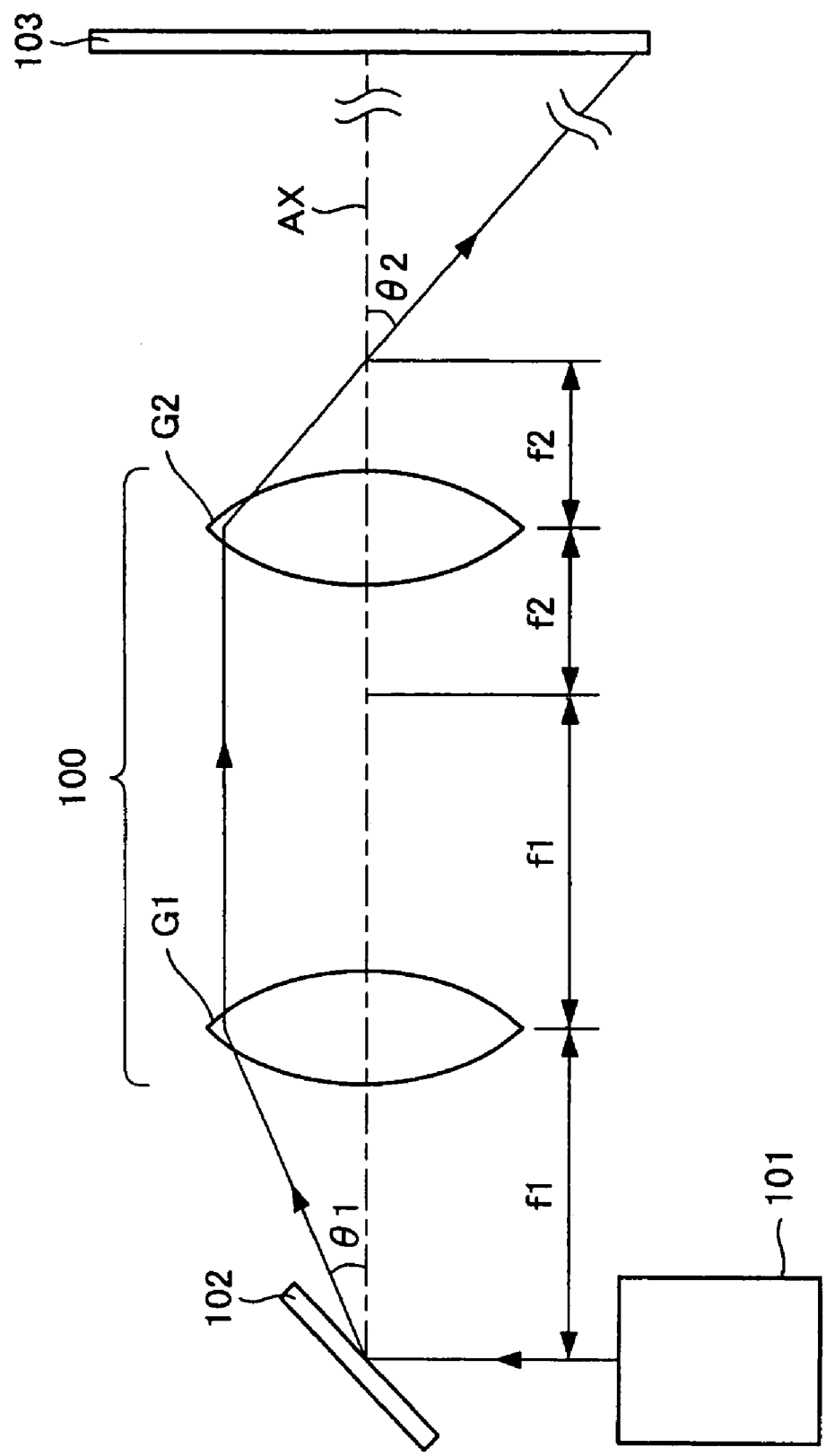
FIG. 1 is a schematic showing a rough construction of a scanning device of a first exemplary embodiment of the invention.

FIG. 1 is a schematic showing a rough construction of a scanning device of a first exemplary embodiment of the invention. Laser light, like a beam emitted from a laser light source 101, is incident on a galvanomirror 102, which plays a role of a scanning part 102. The galvanomirror 102 scans the laser light emitted from the laser light source 101 in a two-dimensional direction with a plane mirror that is rotated approximately two perpendicularly crossing directions. The laser light that has been scanned is incident on a scanning optical system 100. The scanning optical system includes a first lens group G1 having a positive refracting power and a second lens group G2 having the positive refracting power, in this order, from the scanning part 102. The first lens group has a focal distance f1 and the second lens group has a focal distance f2.

The galvanomirror 102 is disposed in the vicinity of a focal position that is located at an incident side of the laser light of the first lens group G1. The first lens group G1 and second lens group G2 are disposed such that the focal position that is located at an exiting side of the laser light of the first lens group G1 (an image side, a screen 103 side in FIG. 1) is approximately coincident with the focal position that is located at an incident side of the laser light of the second lens group G2 (an object side, the galvanomirror 102 side in FIG. 1). This arrangement allows a collimated light, that is incident on the first lens group G1 in the scanning optical system 100, to exit from the second lens group G2 as the collimated light. As just described, the scanning optical system 100 forms an afocal system.

An absolute value |f1/f2| of the value that is calculated by dividing the focal distance f1 of the first lens group G1 by the focal distance f2 of the second lens group G2 is proportional to an angular magnification γ of the scanning optical system 100. The angular magnification γ is defined by γ=θ2/θ1. Here, θ2 is the angle that the laser light exited from the scanning optical system 100 makes with respect to an optical axis AX. θ1 is the angle that the laser light entering the scanning optical system 100 makes with respect to an optical axis AX. In this exemplary embodiment, the absolute value of the angular magnification γ may be larger than 1 and the absolute value of the angular magnification |γ| may be 3. Accordingly, in the scanning optical system 100, the laser light entered from the galvanomirror 102 playing a role of the scanning part is converted into the laser light that has a larger exiting angle than the incident angle and exits. As a result, a wider scanning area can be accomplished on the screen 103 in a simple manner.

Figure 2:
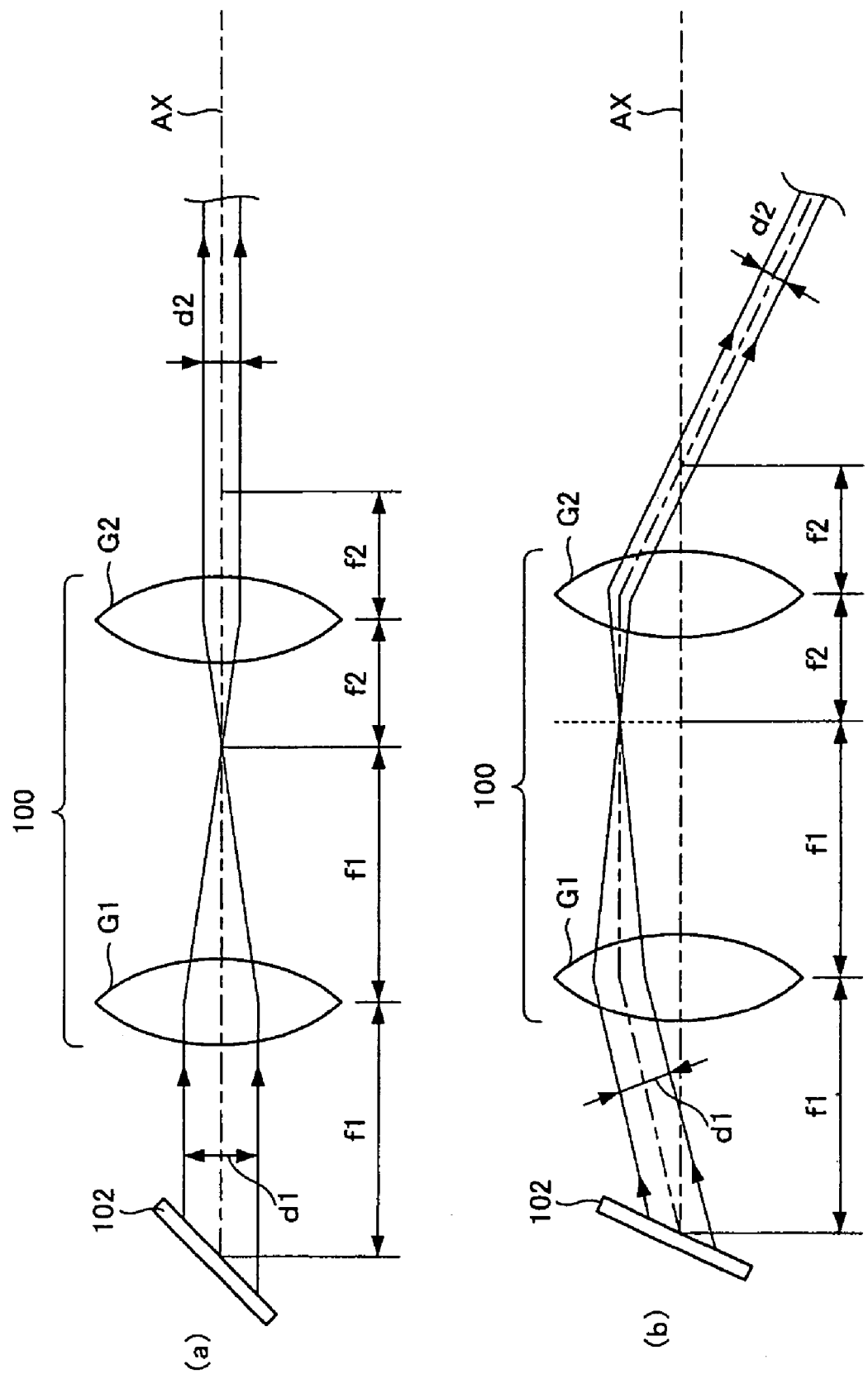
FIGS. 2(a) and 2(b) are schematics showing an optical path of a scanning optical system of a first exemplary embodiment of the invention.

Obviously shown in FIG. 1, the scanning system in this exemplary embodiment forms Newtonian type optical system. Referring to FIGS. 2(a) and (b), a diameter of the beam like laser light will be further described hereafter. FIG. 2 (a) shows behavior of the laser light with a diameter d1 traveling along the optical axis AX. The laser light with the diameter d1 is converted into the laser light with a diameter d2 in the scanning optical system 100. The ratio of the diameter d1 and d2 is equal to the ratio of the focal distance f1 and f2. This enables the diameter d2 that is excited from the scanning optical system 100 to be smaller than the diameter d1. FIG. 2(b) shows behavior of the laser light obliquely entered from off axis. Similarly shown in FIG. 2(a), the laser light with the diameter d1 that obliquely enters the scanning optical system 100 exits as the laser light with the diameter d2 that is smaller than the diameter d1. Accordingly, the beam diameter is reduced inversely proportional to the absolute value of the angular magnification γ in this exemplary embodiment. While both the first lens group G1 and the second lens groups G2 are made up of a single lens having a biconvex shape, the invention is not limited to this. It is applicable to form each lens group with a plurality of lenses. Also, the galvanomirror 102 may scan the laser light emitted from the laser light source 101 in a one-dimensional direction.

Second Exemplary Embodiment

Figure 3:
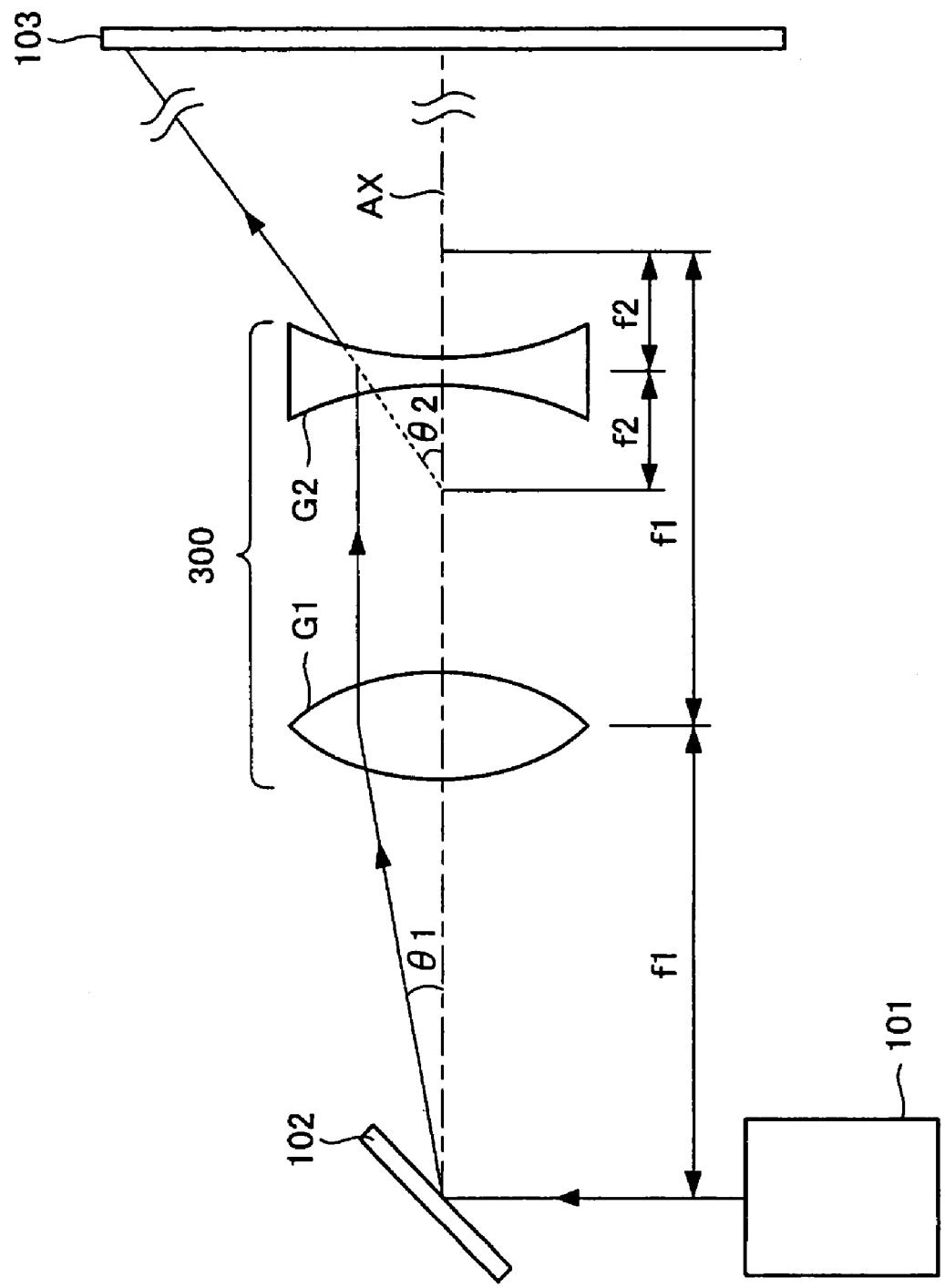
FIG. 3 is a schematic showing a rough construction of a scanning device of a second exemplary embodiment of the invention.

FIG. 3 is a schematic showing a rough construction of a scanning optical system 300 of a second exemplary embodiment of the invention. In the above-mentioned first exemplary embodiment, the second lens group has a positive refracting power. However, in this exemplary embodiment, the second lens group has a negative refracting power. The same label will be given to the part that is same as described in the above-mentioned first exemplary embodiment and overlapping explanations will be omitted. The scanning optical system 300 includes a scanning part 102, a first lens group G1 having a positive refracting power, and a second lens group G2 having a negative refracting power in this order from the scanning part 102 side. The first lens group has a focal distance f1 and the second lens group has a focal distance f2 (a negative value).

The galvanomirror 102, which plays a role of the scanning part 102, is disposed in the vicinity of a focal position that is located at an incident side of the laser light of the first lens group G1. The first lens group G1 and second lens group G2 are disposed such that the focal position that is located at an exiting side of the laser light of the first lens group G1 (an image side, a screen 103 side in FIG. 1) is approximately coincident with the focal position that is located at an incident side of the laser light of the second lens group G2 (an object side, the galvanomirror 102 side in FIG. 1). The laser light exited from the scanning optical system 300 is incident on the screen 103. This arrangement allows a collimated light that is incident on the first lens group G1 in the scanning optical system 300 exits from the second lens group G2 as the collimated light. As just described, the scanning optical system 300 forms an afocal system.

An absolute value of the angular magnification $|\gamma|=|\theta_2/\theta_1|$ that is defined by an exiting angle $\theta_2$ and an incident angle $\theta_1$ may be larger than 1. In this exemplary embodiment, the absolute value of the angular magnification $|\gamma|$ is 3. Accordingly, in the scanning optical system 300, the laser light entered from the galvanomirror 102 is converted into the laser light that has the exiting angle $\theta_2$ that is larger than the incident angle $\theta_1$ and exits. As a result, a wider scanning area can be accomplished on the screen 103 in a simple manner.

Figure 4:
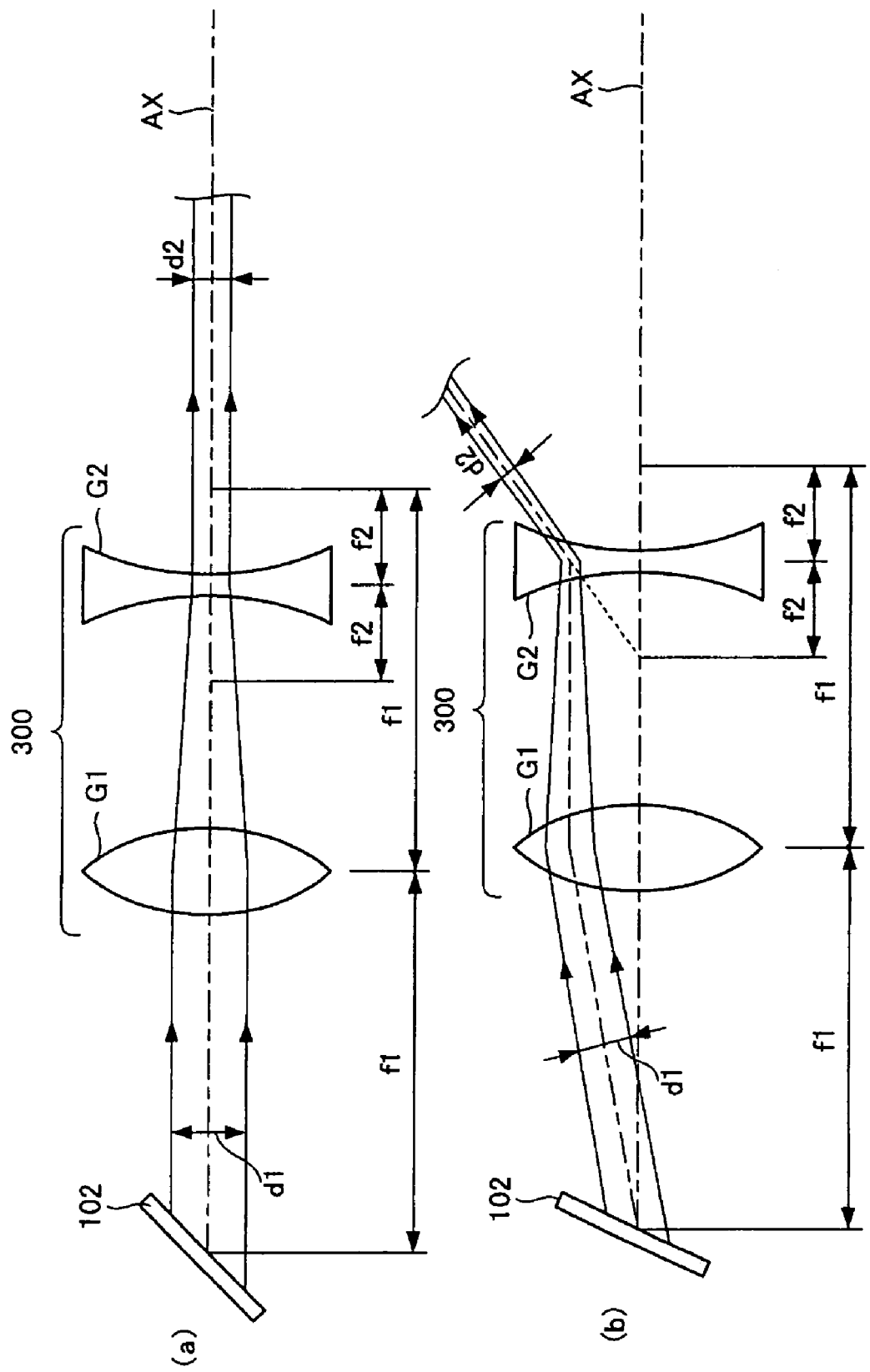
FIGS. 4(a) and 4(b) are schematics showing an optical path of a scanning optical system of a second exemplary embodiment of the invention.

As shown in FIG. 3, the scanning system in this exemplary embodiment forms Galilean type optical system. The Galilean type optical system has an advantage that it is possible to make the whole length of the system shorter than that of the Newtonian type optical system. Referring to FIGS. 4(a) and (b), a diameter of the beam like laser light will be further described hereafter. FIG. 4(a) shows behavior of the laser light with a diameter d1 traveling along the optical axis AX. The laser light with the diameter d1 is converted into the laser light with a diameter d2 in the scanning optical system 300. The ratio of the diameter d1 and d2 is equal to the ratio of the focal distance f1 and f2. This enables the diameter d2 that is exited from the scanning optical system 300 to be smaller than the diameter d1. FIG. 4(b) shows behavior of the laser light obliquely entered from off axis. Similarly shown in FIG. 4(a), the laser light with the diameter d1 that obliquely enters the scanning optical system 100 exits as the laser light with the diameter d2 that is smaller than the diameter d1. Accordingly, the beam diameter is reduced inversely proportional to the absolute value of the angular magnification $\gamma$ in this exemplary embodiment. While the first lens group G1 includes a single lens having a biconvex shape and the second lens groups G2 includes a single lens having a biconcave shape, the invention is not limited to this. It is applicable to form each lens group with a plurality of lenses. Also, in this exemplary embodiment and the above-mentioned first exemplary embodiment, while the first lens group G1 and second lens group G2 are disposed so as to form the afocal system, the invention is not limited to this. It is applicable to dispose the first lens group G1 and second lens group G2 such that a collimated incident light is converged a little bit toward the screen 103. FIG. 1 through FIG. 4 describe the construction and optical paths of the first and second exemplary embodiment to be easily understood. Therefore, the ratio of the focal distance as mentioned above or the like are not illustrated correctly.

Third Exemplary Embodiment

Figure 5:
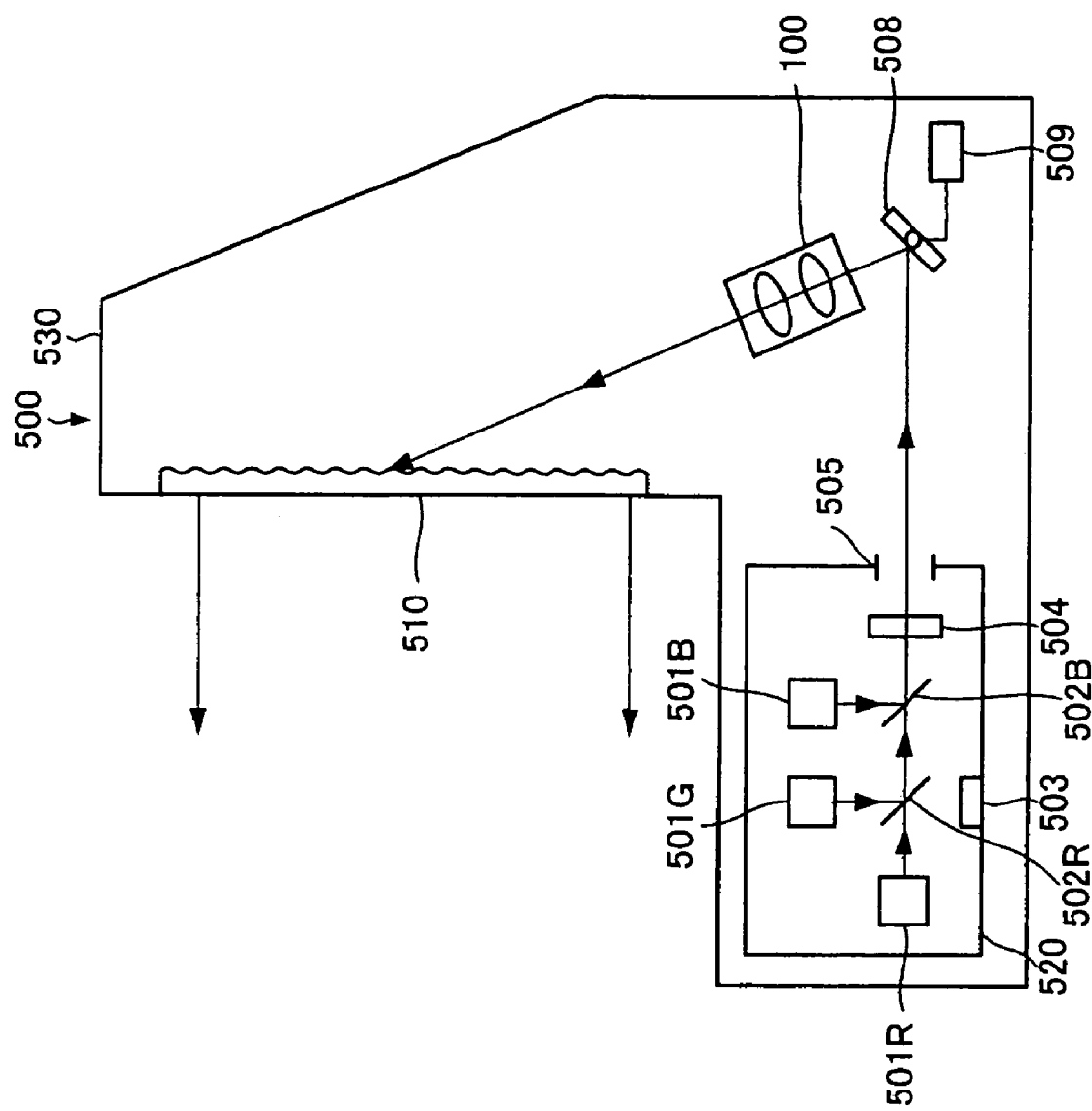
FIG. 5 is a schematic showing a rough construction of a laser projector of a third exemplary embodiment of the invention.

FIG. 5 is a schematic showing a rough construction of a laser projector 500 of a third exemplary embodiment of the invention. A first color laser light source 501R provides a red color laser light (hereinafter called "light R") modulated in accordance with a picture signal. A second color laser light source 501G provides a green color laser light (hereinafter called "light G") modulated in accordance with a picture signal. A third color laser light source 501B provides a blue color laser light (hereinafter called "light B") modulated in accordance with a picture signal. Each color laser light source 501R, 501G, 501B is driven and controlled by a controller 503. Each color laser light source 501R, 501G, 501B and the controller 503 are accommodated in a laser unit 520. A semiconductor laser or a solid-state laser or the like can be used for each color laser light source 501R, 501G, 501B.

A dichroic mirror 502R transmits the light R and reflects the light G. Similarly, a dichroic mirror 502B transmits the light R and the light G and reflects the light B. The laser light emitted from each color laser source 501R, 501G, 501B is combined by the dichroic mirror 502R, 502B and passes through a shutter 504. The laser light passed the shutter 504 exits from an opening 505.

Each color laser light exited from the opening 505 is incident on a galvanomirror 508 that plays a role of a scanning part. A galvanomirror drive 509 rotates the galvanomirror 508 in two axis directions approximately perpendicular to each other. This makes it possible to scan each color laser light in a predetermined plane. Each color laser light reflected by the galvanomirror 508 transmits through the scanning optical system 100 and is incident on the screen 510. One side of the surface of the screen 510 is processed Fresnel shape. Therefore, each color laser light impinged obliquely on the screen 510 is refracted to a predetermined direction by the screen 510 and transmits therethrough and then exits. A viewer (not shown) observes each color laser light transmitted through the screen 510.

In this exemplary embodiment, each color laser light emitted from a laser unit 520 is reflected various directions by the galvanomirror 508. The scanning optical system 100 and the galvanomirror 508 are disposed at the same location as that shown in the above-mentioned exemplary embodiments. Therefore, in the scanning optical system 100, the laser light reflected by the galvanomirror 508 exits toward the screen 510 with the exiting angle that is larger than the incident angle. Consequently, this makes it possible to accomplish a wide projection screen with the condition where the projection distance between the scanning optical system 100 and the screen 510 is shortened. As for the scanning optical system, the scanning optical system 300 shown in the second exemplary embodiment that is Galilean type optical system may be used.

Fourth Exemplary Embodiment

Figure 6:
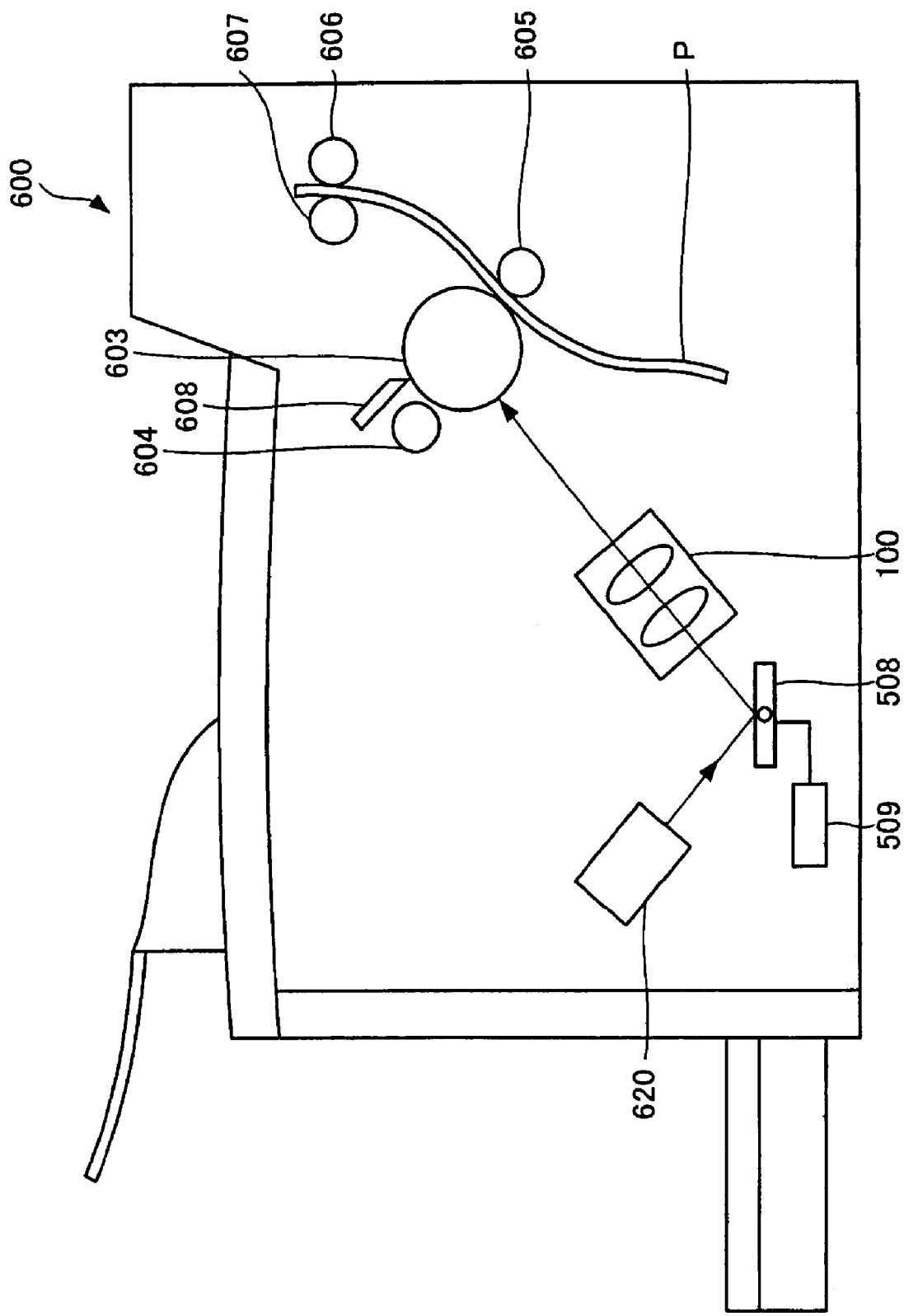
FIG. 6 is a schematic showing a rough construction of a printer of a fourth exemplary embodiment of the invention.

FIG. 6 is a schematic showing a rough construction of a printer 600 of a fourth exemplary embodiment of the invention. A laser light source 620 provides laser light like a beam. A galvanomirror 610, which plays a role of a scanning part, scans the laser light in a one-dimensional direction or a two-dimensional direction. The galvanomirror drive 610 rotates a reflecting mirror surface of the galvanomirror 610 in accordance with a signal from a control unit (not shown). The laser light reflected and scanned by the galvanomirror 610 is incident on a photosensitive drum 603. A surface of the photosensitive drum 603 has been charged with uniform negative static charges by the negative charges of a charging roll 604. The negative charges decreases only on a part of the photosensitive drum 603 that has been exposed by light (a part corresponding to an image). Thus, a latent electrostatic image (a print image) is formed on the photosensitive drum 603. Then, toner charged with negative charges is attracted on the part of the photosensitive drum 603 that has been charged with few negative charges so as to form a toner image on the photosensitive drum 603. Positive charges are supplied to a paper P that is adhered to the photosensitive drum 603 by a transfer roll 605 from backside of the paper P. This results in a toner transformation on the paper P. Then, the paper P is removed from the photosensitive drum 603 at the time when positive charges are discharged from the paper P. The toner transferred on the paper P is fused by heat of a heating roll 606 that plays a role of a fixing part. Simultaneously, the toner is fixed on the paper P with pressure applied by a pressure roll 607. A cleaning blade 608 removes the toner that remains on the photosensitive drum 603. Then, the photosensitive drum 603 is electrically and uniformly charged with negative charges. Printing on the paper P can be carried out by repeating a series of these procedures. This makes it possible to shorten the distance from the scanning optical system 100 to the photosensitive drum 603. As a result, a compact printer can be realized. While a semiconductor laser or a solid-state laser is employed as the laser light source in the above-mentioned exemplary embodiments, the invention is not limited to these. A light emitted diode or the like can be used.

What is claimed is:

1. A scanning device, comprising:
   a scanning part that scans laser light; and
   a scanning optical system on which the laser light from the scanning part is incident,
   the scanning optical system including a first lens group having a positive refracting power and a second lens group, in this order from the scanning part;
   the scanning part being disposed in the vicinity of a focal position that is located at an incident side of the laser light of the first lens group;
   the first lens group and the second lens group being disposed such that a focal position, that is located at an exiting side of the laser light of the first lens group, is approximately coincident with a focal position that is located at an incident side of the laser light of the second lens group; and
   an absolute value of the value that is calculated by dividing the focal distance of the first lens group by the focal distance of the second lens group being larger than 1.

2. The scanning device according to claim 1, the second lens group having the positive refracting power.

3. The scanning device according to claim 1, the second lens group having a negative refracting power.

4. A laser projector, comprising:
   a laser light source, providing laser light;
   a scanning part that scans the laser light in a two-dimensional direction; and
   a scanning optical system on which the laser light from the scanning part is incident,
   the scanning optical system including a first lens group having a positive refracting power and a second lens group, in this order from the scanning part;
   the scanning part being disposed in the vicinity of a focal position that is located at an incident side of the laser light of the first lens group;
   the first lens group and the second lens group being disposed such that a focal position, that is located at an exiting side of the laser light of the first lens group, is approximately coincident with a focal position that is located at an incident side of the laser light of the second lens group; and
   an absolute value of the value that is calculated by dividing the focal distance of the first lens group by the focal distance of the second lens group being larger than 1.

5. The laser projector according to claim 4, the first lens group and the second lens group having the positive refracting power respectively.

6. The laser projector according to claim 4, the first lens group having the positive refracting power and the second lens group having a negative refracting power.

7. A optical device, comprising:
   a laser light source providing laser light;
   a scanning part that scans the laser light; and
   a scanning optical system on which the laser light from the scanning part is incident,
   the scanning optical system including a first lens group having a positive refracting power and a second lens group, in this order from the scanning part;
   the scanning part being disposed in the vicinity of a focal position that is located at an incident side of the laser light of the first lens group;
   the first lens group and the second lens group being disposed such that a focal position, that is located at an exiting side of the laser light of the first lens group, is approximately coincident with a focal position that is located at an incident side of the laser light of the second lens group; and
   an absolute value of the value that is calculated by dividing the focal distance of the first lens group by the focal distance of the second lens group being larger than 1.

8. The optical device according to claim 7, the optical device being a printer.

* * * * *